E. C. KELLY, Jr.
SEPARATOR TRAP.
APPLICATION FILED JUNE 3, 1911.
1,005,433.
Patented Oct. 10, 1911.
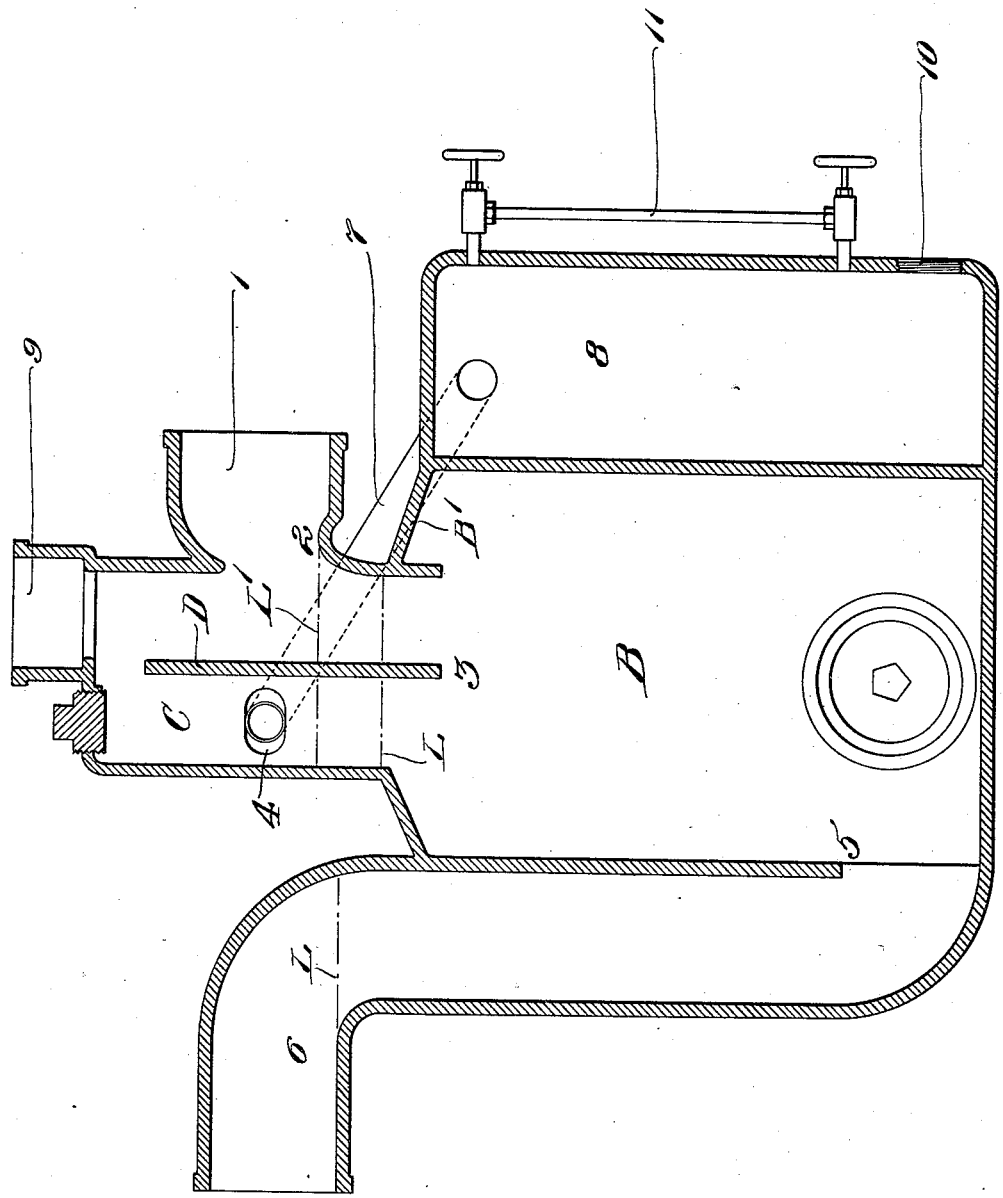

UNITED STATES PATENT OFFICE.

EDWARD C. KELLY, JR., OF BOSTON, MASSACHUSETTS.

SEPARATOR-TRAP.

1,005,433.   Specification of Letters Patent.   Patented Oct. 10, 1911.

Application filed June 3, 1911. Serial No. 630,979.

*To all whom it may concern:*

Be it known that I, EDWARD C. KELLY, Jr., a citizen of the United States, and resident of Boston, in the county of Suffolk and State of Massachusetts, have invented new and useful Improvements in Separator-Traps, of which the following is a specification.

My invention relates to separator traps and has for its object the construction and provision of a trap, which shall separate water from lighter liquids, particularly such liquids as gasolene which mix more readily with water and separate therefrom more slowly than is the case with more viscous oil.

The improved separator trap herein described is especially designed to meet the requirements of municipalities wherein the system of sewers and drains renders the collection of volatile and inflammable vapors dangerous to life and property. In late years the multiplication of automobile garages and repair shops has caused the delivery with waste water of quantities of volatile hydrocarbon into waste and drain pipes and in numerous instances this condition has resulted in damaging explosions. When mixed with water gasolene separates out slowly so that the siphon action of any ordinary trap carries gasolene with the water into the system of drains.

The drawing hereto annexed shows in vertical section a trap which exemplifies my invention.

The trap which is preferably made in a single casting, comprises the trap body B, the top of which at B' slopes upwardly to a collecting chamber C, this chamber lying between the outer wall of the trap and the vertical partition D. The inlet to the trap is at pipe 1 which enters the trap and is directed laterally toward the partition D so that liquids entering the trap first impinge onto this partition which prevents the formation of such a downwardly directed stream as would tend to carry light fluids such as gasolene through the trap body B and under the trap weir 5 to the outlet 6. A vent 9 communicates with the collecting chamber C and with the receiving chamber between the partition D and the inlet 1. This vent may connect with a pipe (not shown) leading to the roof of the building and out of doors. It is preferable to have the vent communicate both with the collecting chamber and the receiving chamber, though its communication with the former is considered to be the more essential. An outlet 4 is provided in the side of the receiving chamber at a point preferably slightly above the normal level of liquids in that portion of the trap and communicates through the pipe 7 to the tank 8. A clean out plug 10 and a sight glass 11 afford means for emptying or inspecting the liquids in the tank 8. The lower edge 3 of the partition D extends below the normal level of liquids in the trap and should be so located that it is a substantial distance below the water level L.

If now a quantity of water with a little light fluid such as gasolene mixed with it enters the trap through the inlet 1, the stream is spread out and broken up by the partition D so that there shall be no opportunity for the siphon action of the trap to carry gasolene with water under the weir 5. Gasolene which enters the body B of the trap rises and either returns to the top of the water in the inlet side of the partition D or is conducted by the sloping top B' into the collecting chamber C. The levels of liquids under normal conditions are illustrated by the dotted lines L and L', L being the water level and L' the gasolene level which may rise as high as the lower edge of the inlet pipe 1. During periods of inaction the volatile liquid in the collecting chamber C and the receiving chamber between the partition D and the inlet pipe 1 will evaporate and be carried off in harmless quantities through the vent 9. Upon the influx of a fresh quantity of liquid the static balance is momentarily disturbed and the liquids in the collecting chamber rise quickly and without agitation since the partition D isolates and protects the liquids in the collecting chamber. This rise of liquid in the collecting chamber will bring the gasolene level L' momentarily to or above the outlet 4 and a small portion of this liquid will then run down the pipe 7 into the tank 8. The disturbance of the liquid impinged against the partition D on entering through the inlet pipe 1 is such that the major part of the gasolene or similar fluid will be found in the collecting chamber C and there the liquids are not disturbed except to the extent of rise in response to the change in pressure and each time waste water runs into the trap in any quantity a portion of the gasolene is removed from the collecting chamber in the manner above described. In the intervals between use of the trap, evaporation goes on steadily and the trap clears itself of volatile liquids. The arrangement of the outlet from the collecting chamber prevents the accumulation of such large quantities of gasolene in the trap itself as to incur liability of escape of a portion thereof to the outlet 6. At the same time the provision for evaporation reduces the quantity of volatile liquid in the trap so that very little needs to be drawn off through the outlet 4 in order to maintain a normally proper condition in the trap. The tank 8 need not be of very large dimensions to contain all of the gasolene waste which is delivered to it through a period of many days. If it be desired the small quantities of gasolene passing from the collecting chamber through the outlet 4 may be carried to some suitable place where evaporation in the presence of abundant quantities of air will dispose of the volatile material harmlessly.

What I claim and desire to secure by Letters Patent is:

1. In a separator-trap, the combination of a trap-body having a top sloping upwardly to a collecting chamber, the collecting chamber, an outlet therefrom above the normal level of liquid in the trap, a receiving chamber adjacent to the collecting chamber, a partition between said chambers extending downward below the normal liquid level, an inlet pipe directed laterally toward said partition, an outlet and trap-weir therefor, and a vent communicating with the collecting chamber.

2. In a separator-trap, the combination of a trap-body having a top sloping upwardly to a collecting chamber, the collecting chamber, an outlet therefor above the normal level of liquid in the trap, a receiving chamber adjacent to the collecting chamber, a partition between said chambers extending downward below the normal liquid level, an inlet pipe directed laterally toward said partition, an outlet and trap-weir therefor, and a vent communicating with the collecting chamber and a tank into which the collecting chamber outlet delivers.

Signed by me at Boston, Massachusetts, this first day of June, 1911.

EDWARD C. KELLY, JR.

Witnesses:
ODIN ROBERTS,
CHARLES D. WOODBERRY.

---

Copies of this patent may be obtained for five cents each, by addressing the "Commissioner of Patents, Washington, D. C."